(12) United States Patent  
Balakrishnan

(10) Patent No.: US 8,288,728 B2  
(45) Date of Patent: Oct. 16, 2012

(54) METHOD AND APPARATUS TO FACILITATE CRYSTAL IDENTIFICATION IN A PET DETECTOR

(75) Inventor: Karthikayan Balakrishnan, Vernon Hills, IL (US)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 58 days.

(21) Appl. No.: 12/916,100

(22) Filed: Oct. 29, 2010

(65) Prior Publication Data

US 2012/0104260 A1    May 3, 2012

(51) Int. Cl.
*G01T 1/20* (2006.01)
*G01T 1/164* (2006.01)

(52) U.S. Cl. .................................. 250/362; 250/363.03
(58) Field of Classification Search .................. 250/362, 250/366, 367, 370.11, 363.03
See application file for complete search history.

(56) References Cited

U.S. PATENT DOCUMENTS 6,087,663 A * 7/2000 Moisan et al. ................ 250/367
2004/0021082 A1* 2/2004 Wong et al. ................... 250/367

OTHER PUBLICATIONS

W. W. Moses, "Time of Flight in PET Revisited," 50 IEEE Transactions on Nuclear Science 5, pp. 1325-1330 (Oct. 2003).

* cited by examiner

*Primary Examiner* — David Porta
*Assistant Examiner* — Faye Boosalis
(74) *Attorney, Agent, or Firm* — Oblon, Spivak, McClelland, Maier & Neustadt, L.L.P.

(57) ABSTRACT

A method for creating a look-up table includes arranging a mask configured to cover a subset of crystals of a plurality of crystals in a scintillation array. The method includes collecting a first set of data from at least one photosensor positioned to receive light generated by the scintillation array. The method further includes realigning the mask in a second position on the scintillation array to cover a second subset of crystals of the plurality of crystals. Further, the method includes collecting a second set of data from the at least one photosensor with the mask aligned on the scintillation array in the second position. Additionally, the method includes creating first and second flood histograms from the first and second sets of collected data, respectively. The method also superimposing the first flood histogram with the second flood histogram to create a superimposed flood histogram.

20 Claims, 11 Drawing Sheets

METHOD AND APPARATUS TO FACILITATE CRYSTAL IDENTIFICATION IN A PET DETECTOR

FIELD

Embodiments described herein relate generally to crystal identification in a Positron Emission Tomography (PET) detector. Specifically, embodiments described herein relate to an improved method and apparatus to facilitate crystal identification in a PET detector.

BACKGROUND

The use of gamma ray detectors in general, and positron emission tomography (PET) in particular, is growing in the field of medical imaging. In PET imaging, a radiopharmaceutical agent is introduced into the object to be imaged via injection, inhalation, or ingestion. After administration of the radiopharmaceutical, the physical and bio-molecular properties of the agent will cause it to concentrate at specific locations in the human body. The actual spatial distribution of the agent, the intensity of the region of accumulation of the agent, and the kinetics of the process from administration to eventually elimination are all factors that may have clinical significance. During this process, a positron emitter attached to the radiopharmaceutical agent will emit positrons according to the physical properties of the isotope, such as half-life, branching ratio, etc.

The radionuclide emits positrons, and when an emitted positron collides with an electron, an annihilation event occurs, wherein the positron and electron are destroyed. Most of the time, an annihilation event produces two gamma rays (at 511 keV) traveling at substantially 180 degrees apart.

PET imaging systems use detectors positioned across from one another to detect the gamma rays emitting from the object. Typically a ring of detectors is used in order to detect gamma rays coming from each angle. Thus, a PET scanner is typically substantially cylindrical to be able to capture as much radiation as possible, which should be, by definition, isotropic. The use of partial rings and rotation of the detector to capture missing angles is also possible, but these approaches have severe consequences for the overall sensitivity of the scanner. In a cylindrical geometry, in which all gamma rays included in a plane have a chance to interact with the detector, an increase in the axial dimension has a very beneficial effect on the sensitivity or ability to capture the radiation. Thus, the best design is that of a sphere, in which all gamma rays have the opportunity to be detected. Of course, for application to humans, the spherical design would have to be very large and thus very expensive. Accordingly, a cylindrical geometry, with the axial extent of the detector being a variable, is realistically the starting point of the design of a modern PET scanner.

Once the overall geometry of the PET scanner is known, another challenge is to arrange as much scintillating material as possible in the gamma ray paths to stop and convert as many gamma rays as possible into light. In order to be able to reconstruct the spatio-temporal distribution of the radio-isotope via tomographic reconstruction principles, each detected event will need to be characterized for its energy (i.e., amount of light generated), its location, and its timing. Most modern PET scanners are composed of several thousand individual crystals, which are arranged in modules and are used to identify the position of the scintillation event. Typically crystal elements have a cross section of roughly 4 mm×4 mm. Smaller or larger dimensions and non-square sections are also possible. The length or depth of the crystal will determine how likely the gamma ray will be captured, and typically ranges from 10 to 30 mm. The detector module is the main building block of the scanner.

As described above, a PET imaging system is more than just a counter and, in addition to detecting the presence of a scintillation event, the system must identify its location. Conceptually, perhaps the most straightforward design to allow identification of the location of each interaction is to have a separate photosensor and data acquisition channel for each scintillator crystal. Due to constraints such as the physical size of common photosensors, the power required for each data acquisition channel, and the associated cost of these items, some form of multiplexing is usually used to reduce the number of photosensors and channels of electronics. Accordingly, since an individual photosensor detects gamma rays incident upon more than one crystal, and gamma rays incident on a crystal is detected by more than one photosensor, the outputs of the photosensors need to be identified with an individual crystal.

Generally, the entire crystal array is flooded with gamma-rays to make a flood histogram. The peaks of the flood histogram are then found then found using image processing techniques. However, there is often a manual intervention where a human may click on peaks on the flood-histogram where the automated image processing techniques fail. Accordingly, there is no automated process for identifying a large number of crystals in a commercial setting.

BRIEF DESCRIPTION OF THE DRAWINGS

A more complete appreciation of the present advancements and many of the attendant advantages thereof will be readily obtained as the same becomes better understood by reference to the following detailed description when considered in connection with the accompanying drawings. However, the accompanying drawings and their example depictions do not in any way limit the scope of the present advancements embraced by the specification. The scope of the present advancements embraced by the specification and drawings are defined by words of the accompanying claims.

DETAILED DESCRIPTION

Figure 1:
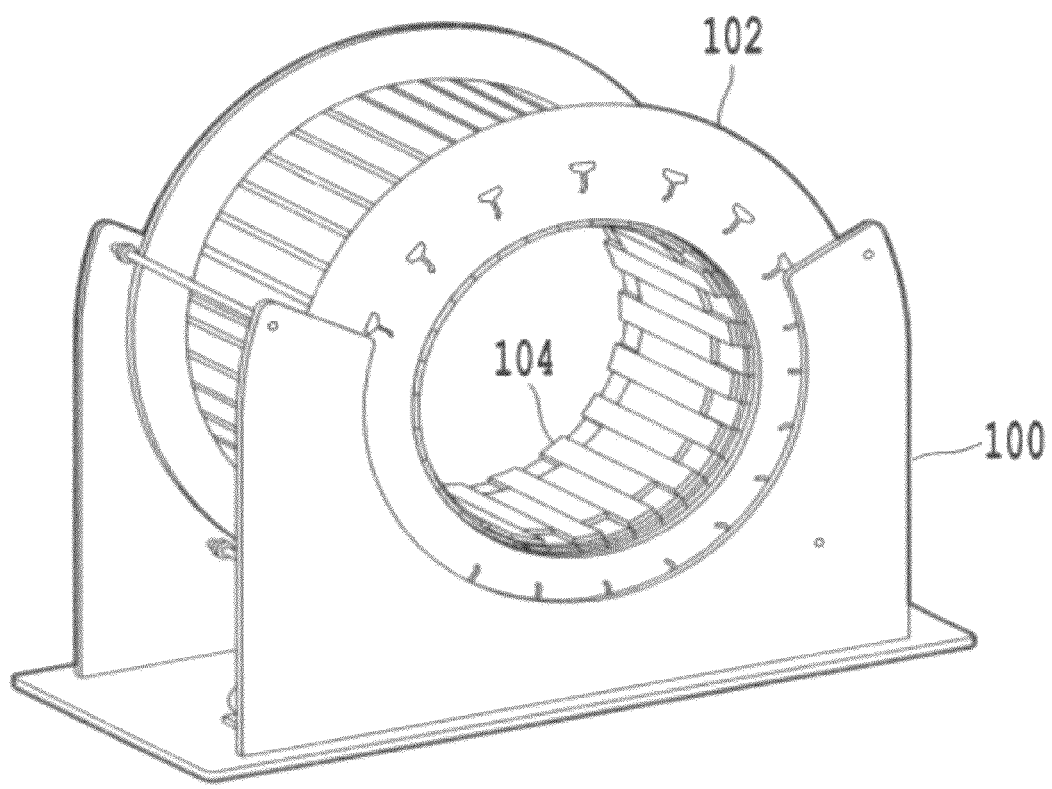
FIG. 1 illustrates an example cylindrical PET detector.

Embodiments disclosed herein include a method for creating a look-up table for determining a crystal of interaction in a gamma ray detector. The method includes arranging a mask configured to cover a subset of crystals of a plurality of crystals in a scintillation array so as to block exposure of the subset of crystals to gamma rays, where the mask is aligned on the scintillation array in a first position to cover a first set of crystals. The method includes exposing the scintillation array to gamma rays having a predetermined energy. Further, the method includes collecting a first set of data from at least one photosensor positioned to receive light generated by the scintillation array. The method also includes realigning the mask in a second position on the scintillation array to cover a second subset of crystals of the plurality of crystals, where the second subset of crystals are different than the first subset of crystals. Additionally, the method includes repeating the exposing step with the mask aligned on the scintillation array in the second position. Next, the method includes collecting a second set of data from the at least one photosensor with the mask aligned on the scintillation array in the second position. The method includes creating a first flood histogram from the first set of collected data, and creating a second flood histogram from the second set of collected data. The method further includes superimposing the first flood histogram with the second flood histogram to create a superimposed flood histogram. The method also includes generating a look-up table by assigning regions of the superimposed flood histogram to corresponding crystals of the plurality of crystals.

Embodiments disclosed herein include a method for creating a look-up table for determining a crystal of interaction in a gamma ray detector. The method includes arranging a mask configured to cover a subset of crystals of a plurality of crystals in a scintillation array so as to block exposure of the subset of crystals to gamma rays, where the mask is aligned on the scintillation array in a first position to cover a first set of crystals. The method includes exposing the scintillation array to gamma rays having a predetermined energy. Further, the method includes collecting a first set of data from at least one photosensor positioned to receive light generated by the scintillation array. The method also includes removing the mask from the scintillation array. Additionally, the method includes repeating the exposing step with the mask removed from the scintillation array position. Next, the method includes collecting a second set of data from the at least one photosensor with the mask aligned on the scintillation array in the second position. The method includes creating a first flood histogram from the first set of collected data, and creating a second flood histogram from the second set of collected data. The method further includes subtracting the first flood histogram from the second flood histogram to create a modified flood histogram. The method also includes generating a look-up table by assigning regions of the first flood histogram and modified flood histogram to corresponding crystals of the plurality of crystals.

Embodiments disclosed herein include a Positron Emission Tomography (PET) system for crystal identification, the system including a scintillation array including a plurality of crystals, and a mask configured to cover a subset of crystals of the plurality of crystals so as to block exposure of the subset of crystals to gamma rays. The system includes at least one photosensor positioned to receive light generated by the scintillation array. The system further includes a processor configured to collect a first set of data from the at least one photosensor in response to exposure of the scintillation array to gamma rays when the mask is arranged on the scintillation array in a first position to cover a first subset of crystals. The process is further configured to collect a second set of data from the at least one photosensor in response to exposure of the scintillation array to gamma rays when the mask is arranged on the scintillation array in a second position to cover a second subset of crystals that are different than the first subset of crystals. The processor is further configured to create a first flood histogram from the first set of collected data and a second flood histogram from the second set of collected data. Additionally, the processor is configured to superimpose the first flood histogram with the second flood histogram to create a superimposed flood histogram, and generate a look-up table by assigning regions of the superimposed flood histogram to corresponding crystals of the plurality of crystals.

Embodiments disclosed herein include a Positron Emission Tomography (PET) system for crystal identification, the system including a scintillation array including a plurality of crystals, and a mask configured to cover a subset of crystals of the plurality of crystals so as to block exposure of the subset of crystals to gamma rays. The system includes at least one photosensor positioned to receive light generated by the scintillation array. The system further includes a processor configured to collect a first set of data from the at least one photosensor in response to exposure of the scintillation array to gamma rays when the mask is arranged on the scintillation array in a first position to cover a first subset of crystals. The process is further configured to collect a second set of data from the at least one photosensor in response to exposure of the scintillation array to gamma rays when the mask is removed from the scintillation array. The processor is further configured to create a first flood histogram from the first set of collected data and a second flood histogram from the second set of collected data. Additionally, the processor is configured to subtract the first flood histogram from the second flood histogram to create a modified flood histogram. The processor is also configured to generate a look-up table by assigning regions of the first flood histogram and the modified flood histogram to corresponding crystals of the plurality of crystals.

According to one embodiment, a method facilitates the detection and mapping of edge crystals in a scintillator array with less ambiguity than current methods. In one embodiment, the method includes using a mask that is placed over a scintillator array used in a PET system. As an example, the mask is configured to block exposure of crystals to gamma rays that are covered by the mask. Accordingly, by using the mask to block the exposure of the crystals to gamma rays, identification of each crystal in the scintillator array becomes easier due to removal of interference from neighboring crystals.

FIG. 1 illustrates an example cylindrical PET detector 100 having a cylindrical ring 102. According to some embodiments, the PET detector includes a plurality of scintillator arrays 104. The patient or subject to be imaged is placed inside the cylinder 102. A radio pharmaceutical (a positron emitter) is administered to the subject. Positrons are emitted when the radio-pharmaceutical decays. These positrons interact with nearby electrons and both are annihilated, generating two 511 keV collinear gamma-rays. These gamma-rays then interact with the scintillator and are converted to optical photos. Photomultiplier tubes (PMTs) optically coupled with the scintillator crystal detect the optical photos and produce an electrical signal proportional to the energy of the incident gamma-ray. By detecting these two gamma-rays over many such decay processes, and using the tomographic reconstruction process, it is possible to map an image of the actual spatial distribution of the administered radio-pharmaceutical.

Figure 2:
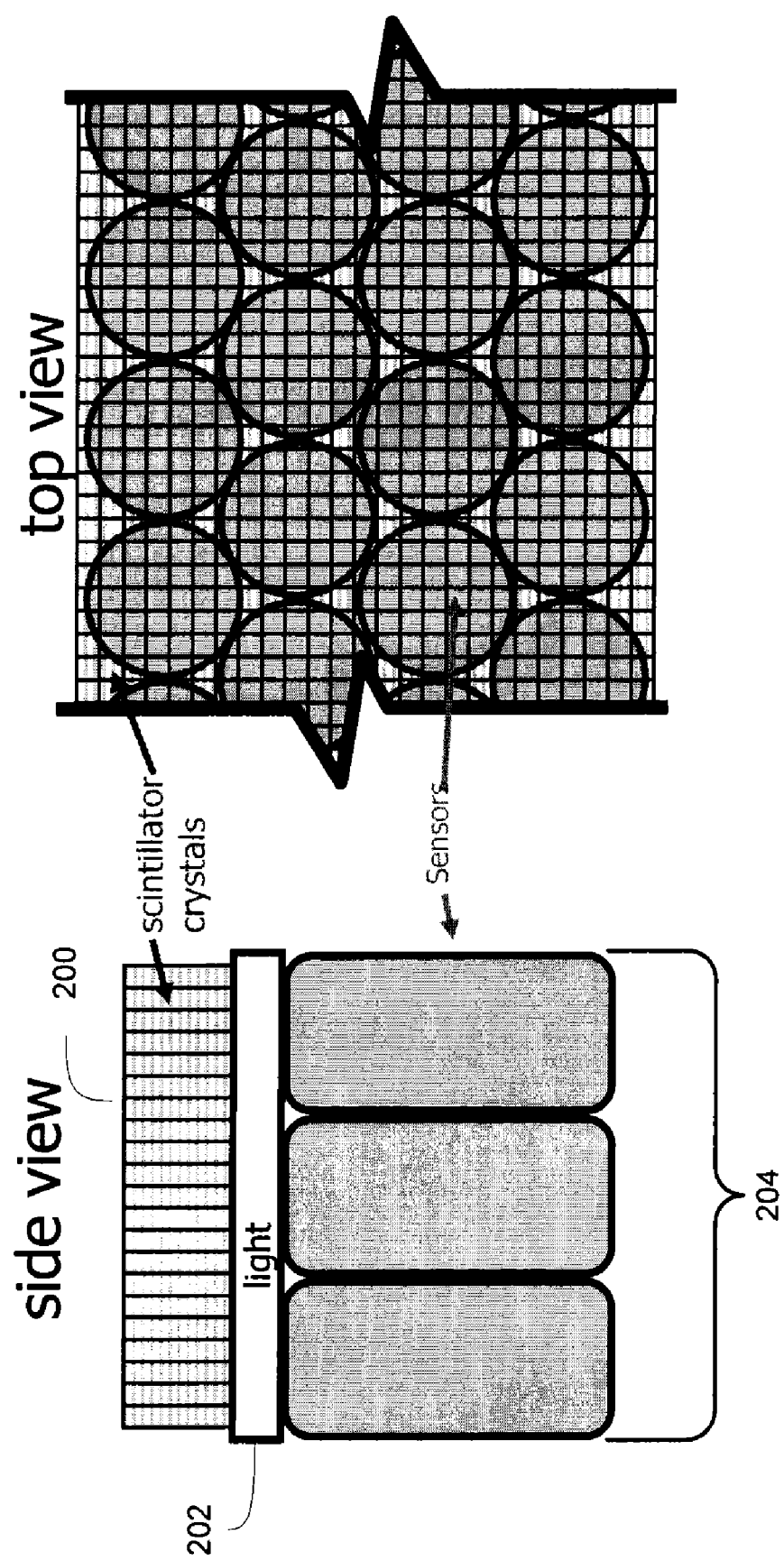
FIG. 2 shows two views of a detector illustrating the arrangement of scintillator crystals.

In one embodiment, one PMT is optically coupled to more than one scintillator crystal. FIG. 2 shows two views of a detector illustrating the arrangement of the scintillator crystals 200, light guide 202, and photosensors 204 (e.g., PMT). As illustrated in FIG. 2, the photosensors 204 receive light from more than one crystal. In one embodiment, a light guide spreads the scintillation light from a single scintillator crystal over multiple photosensors.

Figure 3:
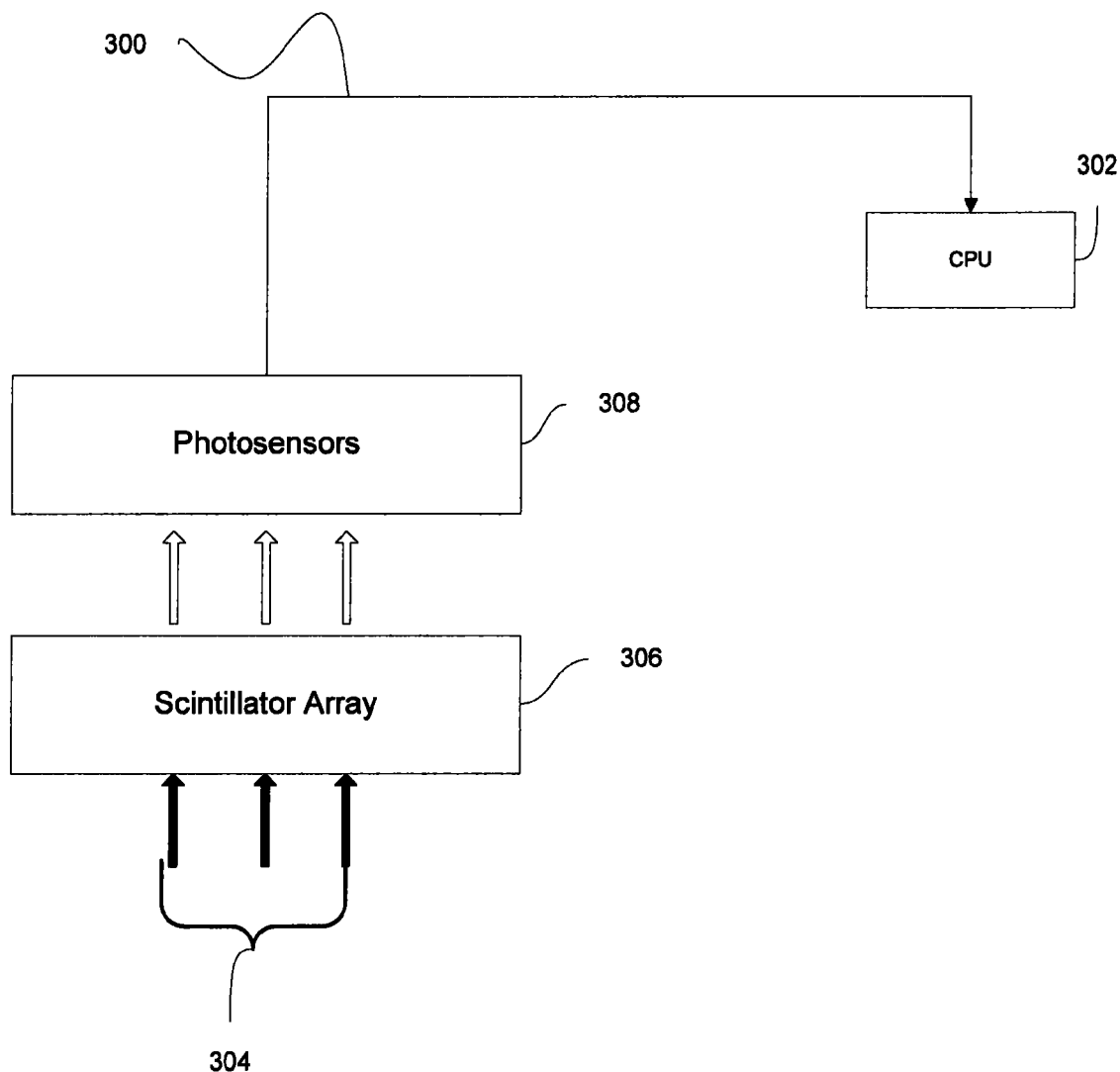
FIG. 3 illustrates an example PET system.

FIG. 3 illustrates an example PET system including a CPU 302, gamma rays 304, a scintillator array 306, and photosensors 308. In one embodiment, gamma rays 304 are emitted at 511 keV towards the scintillator array 306. Examples of sources that produce gamma rays include a patient ingesting a pharmaceutical agent causing an annihilation event. When the gamma rays hit the scintillator array 306, one or more crystals are activated and light is emitted to one or more photosensors 308. Upon receiving the light, the photosensors 308 convert the light into electrical signals, which are sent to the CPU 302 for analysis of the detected information. According to some embodiments, the CPU 302 is remote from the PET system 300 and wirelessly communicates with the PET system 300.

Figure 4:
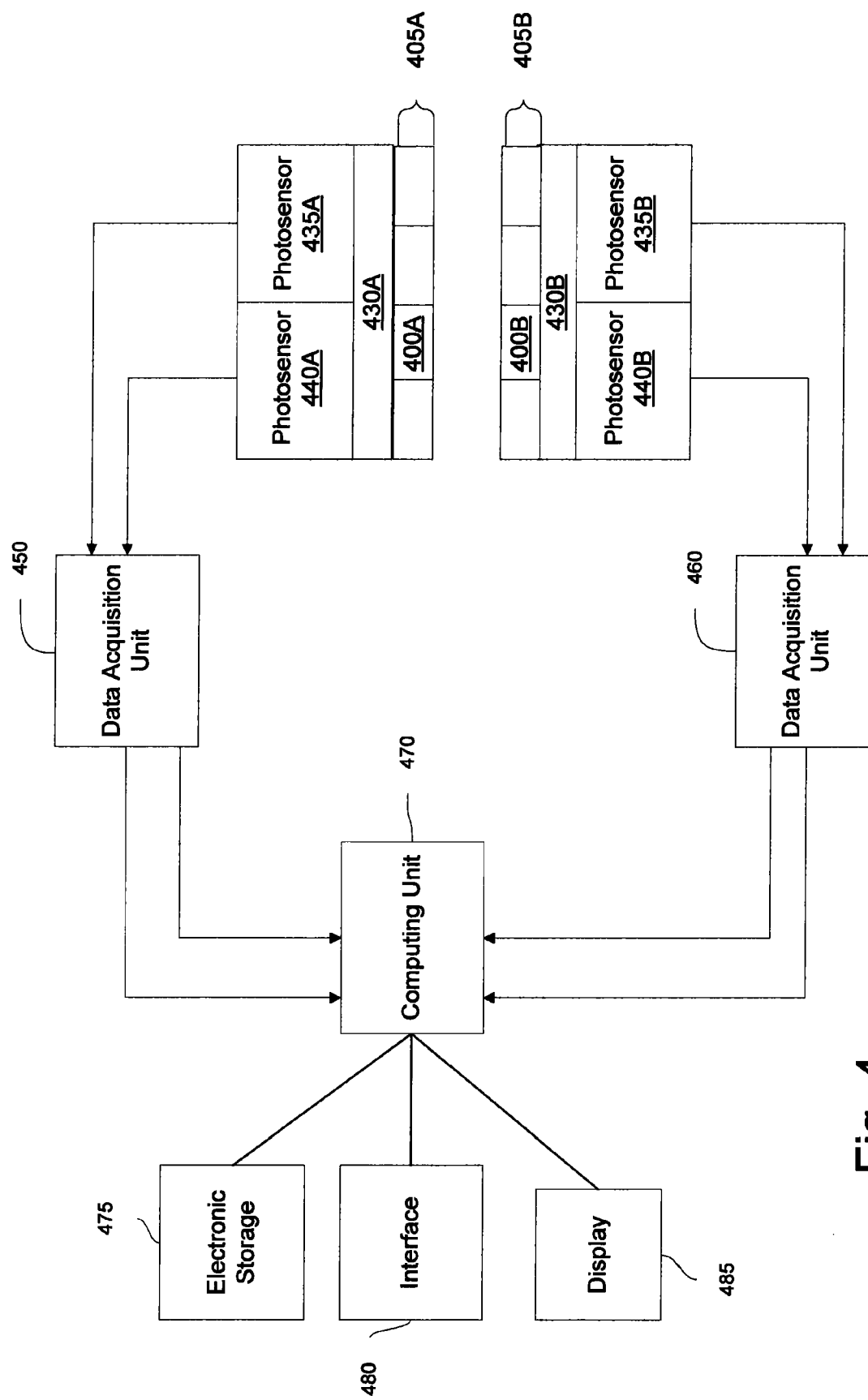
FIG. 4 is a schematic drawing of a gamma ray detection system.

FIG. 4 is a schematic drawing of a gamma ray detection system according to one embodiment. As one of ordinary skill will recognize, the gamma ray detection system of FIG. 4 forms part of a positron emission tomography (PET) system or a Time-of-Flight (TOF) PET system. Further discussion of PET and Time-of-Flight PET systems is omitted for brevity. However, a discussion of Time-of-Flight PET systems is found in "Time of Flight in PET Revisited," by W. W. Moses, *IEEE Transactions on Nuclear Science*, Vol. 50, No. 5, pp. 1325-1330, the entire contents of which are incorporated herein by reference.

According to one embodiment, the gamma ray detection system in FIG. 4 includes a computing unit 470 that corresponds to the CPU 302 (FIG. 3). The gamma ray detection system in FIG. 4 includes photosensors 435A, 435B, 440A, and 440B that correspond to photosensors 310 (FIG. 3). In one embodiment, photosensors 435A, 435B, 440A, and 440B are nonlinear.

In FIG. 4, photosensors 435A and 440A are arranged over light guide 430A, and the array of scintillation crystals 405A is arranged beneath the light guide 430A. One skilled in the art would recognize that embodiments can be applied to detectors using any desired photosensors, including silicon photomultipliers (SiPMs), or arrays of SiPMs. A second array of scintillation crystals 405B is disposed opposite to the scintillation crystal array 405A with light guide 430B and photosensors 435B and 440B arranged thereover.

In FIG. 4, when gamma rays are emitted from a body under test (not shown), the gamma rays travel in opposite directions, approximately 180° from each other. Gamma ray detection occurs nearly simultaneously at crystal of interaction 400A and crystal of interaction 400B, and a scintillation event is determined when the gamma rays are detected at crystal of interaction 400A and crystal of interaction 400B within a predefined time limit. Thus, the gamma ray detection system detects gamma rays nearly simultaneously at crystals of interaction 400A and 400B. However, for simplicity only gamma detection at crystal of interaction 400A is described herein. One of ordinary skill in the art will recognize, however, that the description given with respect to crystal of interaction 400A is equally applicable to gamma ray detection at crystal of interaction 400B.

Returning to FIG. 4, each photosensor 435A, 440A, 435B, and 440B is connected to a data acquisition unit 450 or 460. The data acquisition units 450 and 460 generate a digitized output value by integrating a corresponding waveform generated by the photosensors 435A, 440A, 435B, and 440B in response to the scintillation light.

Data acquisition units 450 and 460 include analog-to-digital converters, such as sigma-delta converters operating at sampling rates between one gigahertz and five gigahertz. Alternatively, data acquisition units 450 and 460 include multi-threshold samplers that sample the photosensor waveforms using voltage-threshold triggers rather than a constant sampling rate. As one of ordinary skill in the art will recognize, other sampling methods and data acquisition devices are also possible. For example, separate energy and timing channels can be used. In this case, typically the energy channel uses a shaping filter and a lower-sampling-rate analog-to-digital converter. The timing channel typically sums the signals from multiple photosensors. The summed timing signal is then input into a comparator, and a time-to-digital converter generates a time-stamp for the arrival of each event.

After the output values are acquired, they are provided to computing unit 470 for processing to determine the crystal of interaction and the energy level of the annihilation event according to the method described in detail below. The output values and time of arrivals are then stored in electronic storage 475 and can be displayed on display 485. Interface 480 is used to configure and/or control the computing unit 470 and/or provide further instruction to the central processing unit 470.

As one skilled in the art would recognize, display 485 is a cathode ray tube display (CRT), liquid crystal display (LCD), etc. Interface 480 is a keyboard, mouse, trackball, microphone, touch screen, or any other known device for interfacing with a central processing unit. One of ordinary skill will also recognize that the electronic storage 475 is a hard disk drive, CD-ROM, DVD disk, FLASH memory, or another central processing unit. Further, electronic storage 475 is removable or detachable from computing unit 470 or is affixed thereto. Electronic storage 475 is connected to the computing unit via a network, and is therefore located in a separate room, building or other location relative to the computing unit 470.

Figure 5:
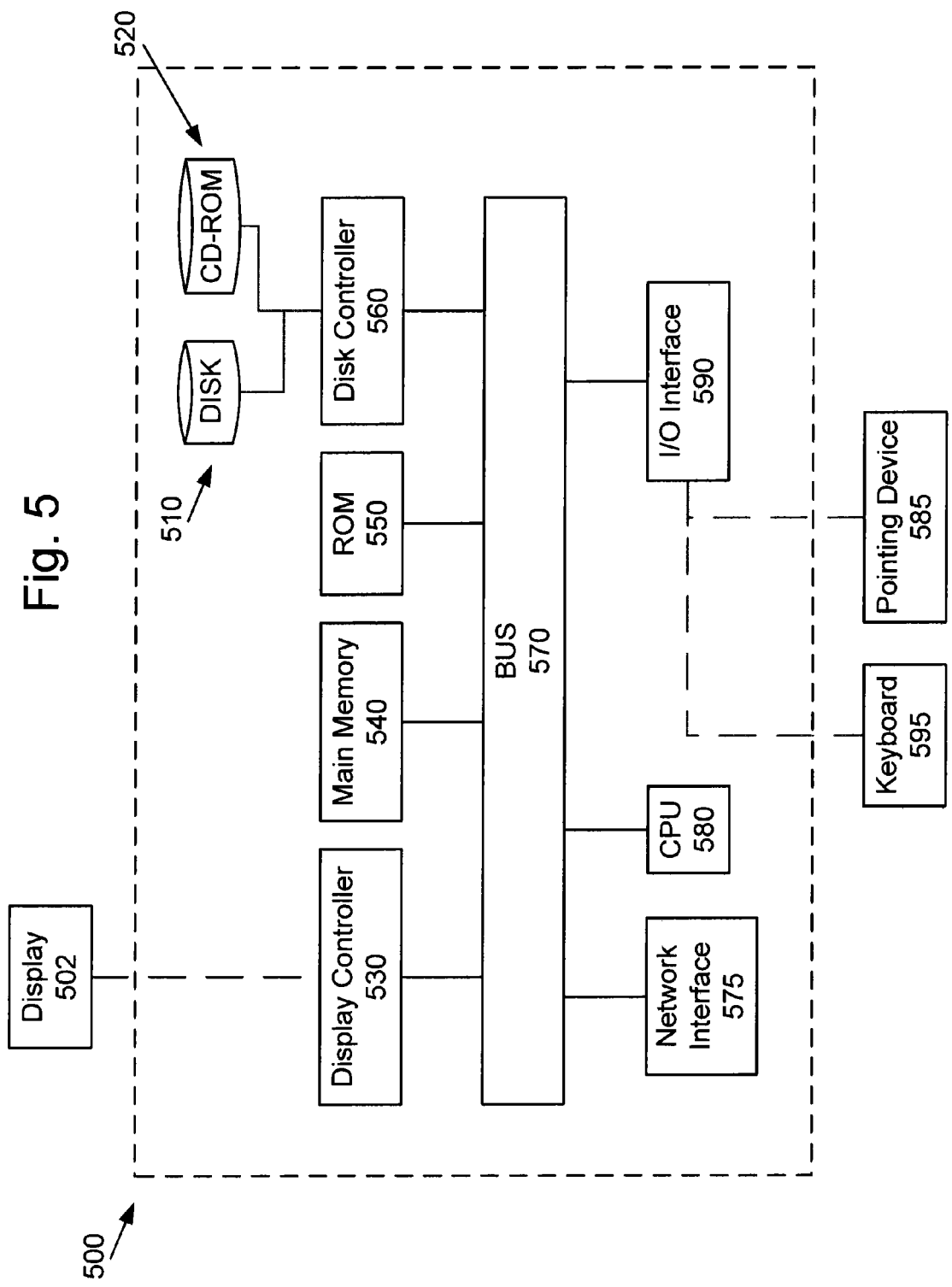
FIG. 5 is a block diagram of a processor utilized to implement the PET system.

FIG. 5 is a block diagram of a processor 500 that is utilized to implement the PET system 300 (FIG. 3) or the computing unit 470 (FIG. 4). According to some embodiments, one or more processors 500 operating in parallel with each other is utilized to implement the PET system 300 (FIG. 3) or PET management system 470 (FIG. 4).

In one embodiment, the server 500 includes a CPU 580 which processes data and instructions stored in main memory 540 and/or ROM 550. The CPU 580 also processes information stored on the disk 510 or CD-ROM 520. As an example, the CPU 580 is an IBM System X from IBM of America employing at least one Xenon processor from Intel of America or an Opteron processor from AMD of America. Thus, instructions corresponding to a process in a mobile device is stored on any one of the disk 510, CD-ROM 520, main memory 540 or ROM 550.

In one embodiment, the processor 500 also includes a network interface 575, such as an Intel Ethernet PRO network interface card from Intel Corporation of America, a display controller 530, such as a NVIDIA GeForce GTX graphics adaptor from NVIDIA Corporation of America for interfacing with a display 502, such as a Hewlett Packard HP L2445w LCD monitor. The processor 500 also includes an I/O interface 590 for interfacing with a keyboard 595 and pointing device 585, such as a roller ball or mouse. According to some embodiments, the disk controller 560 interconnects disk 510, such as a hard disk drive or FLASH memory drive, and CD-ROM 520 or DVD drive with bus 570, which is an ISA, EISA, VESA, PCI, or similar for interconnecting all of the components of the server 500. A description of the general features and functionality of the display 502, keyboard 595 and pointing device 585, as well as the display controller 530, disk controller 560, network interface 575 and I/O interface 590 is also omitted for brevity as these features are well known. Of course, other processor and hardware vendors and types are known in the art such as Freescale ColdFire, i.MX and ARM processors from Freescale Corporation of America.

The example processor 500 of FIG. 5 is a hardware platform of a computing device, such as a PC, and CPU 580 is an Intel Pentium Processor, or any other desired processor known in the art. The computer-readable instructions stored on any one of the main memory 540, ROM 550, disk 510 or CD-ROM 520 is provided as a utility application, background daemon, or component of an operating system, or combination thereof, executing in conjunction with CPU 580 and an operating system such as Microsoft VISTA, UNIX, Solaris, LINUX, Apple MAC-OS and other systems known to those skilled in the art. Main memory 540 is a random access memory (RAM), FLASH memory, EEPROM memory, or the like, while ROM 550 is Read Only Memory, such as PROMs. Further descriptions of the main memory 540 and the ROM 550 are omitted for brevity as such memory is well known.

Figure 6:
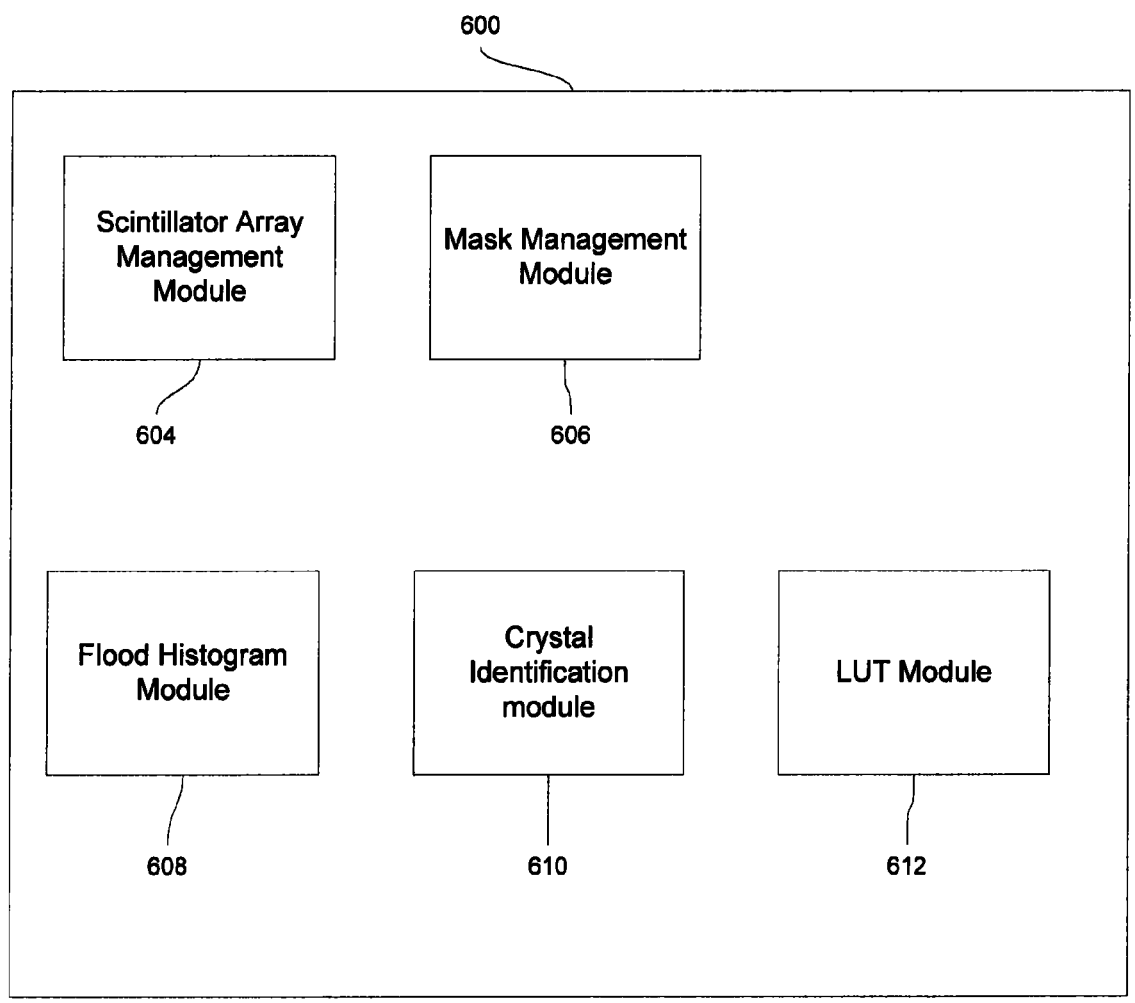
FIG. 6 illustrates an example PET management system.

FIG. 6 illustrates an example PET management system 600 including one or more modules. In one embodiment, modules are hardware or a hardware/software combination. The PET management system 600 is implemented in the CPU 302 (FIG. 3) or the computing unit 470 (FIG. 4). According to one embodiment, the PET management system 600 includes a Scintillator Array Management Module 604, a Mask Management Module 606, a Flood Histogram Module 608, Crystal Identification Module 610, and Look-Up Table (LUT) Module 612.

According to one embodiment, the Scintillator Array Management Module 604 keeps track of the different types of scintillator arrays. As an example, a scintillator array is arranged in an N×N array.

In one embodiment, the Mask Management Module 606 keeps track of each mask. As an example, with an N×N mask having a lattice structure, every odd-numbered or even-numbered crystal is covered. As another example, a subset of the crystals in the array (e.g., N/2×N/2) are covered by a mask with a block structure. Accordingly, in one embodiment, the Mask Management Module 606 keeps track of which crystals are covered by a mask.

In one embodiment, the Flood Histogram Module 608 performs an algorithm to create a flood histogram. In further embodiments, the Crystal Identification Module 610 performs an algorithm to identify the crystals. As an example, the Crystal Identification Module 610 accesses the Scintillator Array Management Module 604 and the Mask Management Module 606 to retrieve information regarding a scintillator array and mask used for a particular flood histogram. Accordingly, the Crystal Identification Module 610 performs the crystal identification process based on the scintillator array and mask used. According to some embodiments, the LUT Module 612 performs an algorithm to create a look-up table.

As illustrated in FIG. 2, the light generated from a scintillation process when a gamma-ray interacts with a crystal is detected by more than one adjoining PMT based on the physical position of the interaction. The actual position of the interaction (vertical position Y, and the axial position Z) in the scintillator array is determined, according to some embodiments, using Anger logic and the signals from all the PMTs which register a signal.

According to one embodiment, the image reconstruction process uses the identities of individual crystal elements rather than the XY positions. Therefore, mapping the XY positions to individual crystals in the array facilitates the image reconstruction process. In addition to the reconstruction process, prior to a PET scan, corrections such as energy corrections, timing corrections, etc., is applied on a crystal-by-crystal basis rather than the XY positions. This process of converting the XY positions to individual crystal elements is referred to as the crystal identification. According to some embodiments, a lookup-table (LUT) is created from the crystal identification process. As an example, a lookup-table correlates one or more XY positions to an individual crystals. The LUT is created once and stored in memory. Once created, the same LUT is used repeatedly in regular scans to assign events to crystals.

In one embodiment, the LUT table is created by irradiating the crystal array with gamma-rays in such a manner that all the crystals have a sufficient number of rays incident on them. These events are then histogrammed into a 2D map. This map is referred to as the "flood histogram." The flood-histogram is processed with a variety of automated and semi-automated algorithms to identify the peaks and assign the peaks to crystals. The automated processes, however, may not identify all the peaks, especially for the edge crystals where the peaks are spaced too close together.

Accordingly, in one embodiment, a mask is placed on the scintillator array to facilitate detection of each crystal in a scintillator array. The mask is made with a high density material such as lead or tungsten with sufficient thickness so that the incident 511 keV gamma rays can be stopped or severely attenuated. In one embodiment, the mask is a monolithic piece of material. In further embodiments, the mask is fabricated in a lattice pattern.

According to one embodiment, the scintillator array is exposed to the incident gamma-rays first with a mask and then without the mask. With the mask overlaid on the scintillator array, certain crystal elements are exposed to the gamma-rays and some are not. A flood histogram made with this exposure has peaks placed very differently and farther apart than a flood-histogram without the mask. Therefore, the identification of the peaks becomes easier since they are spaced apart. According to one embodiment, the pixels not exposed to the first exposure are exposed to the incident gamma-rays in a second pass. During the second exposure, the mask is displaced to cover the crystals exposed in the first exposure or with the mask completely removed, which exposes all the crystals.

Figure 7:
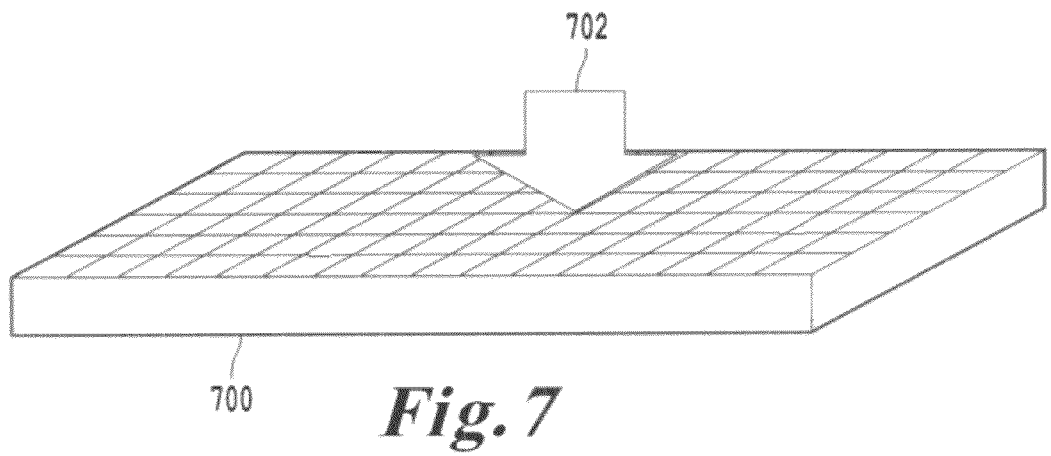
FIG. 7 illustrates an example scintillator array.
Figure 8:
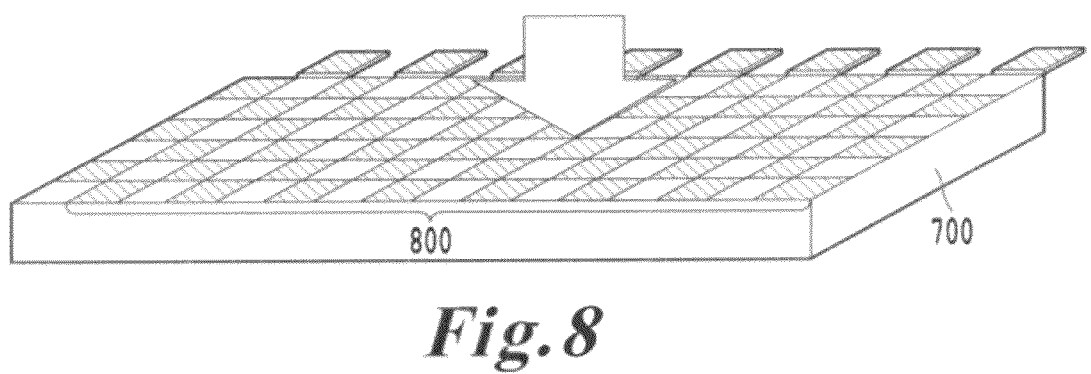
FIG. 8 illustrates a scintillator array with a mask having a lattice structure in a first position.

FIG. 7 illustrates an example scintillator array 700. As illustrated in FIG. 7, the scintillator array 700 is a 6×16 array. However, in other embodiments, any desired dimension (i.e., N×M array) is possible. The arrow 702 illustrates the direction in which one or more gamma rays are incident upon the scintillator array 700. The scintillator array 700 is specified in the Scintillator Array Management Module 604. FIG. 8 illustrates a scintillator array with an example mask 800 placed on the scintillator array in a first position. As illustrated in FIG. 8, the mask 800 is a lattice structure that covers every other crystal in each row and column of the array 700. In one embodiment, the mask 800 is configured to block 511 keV gamma rays. Examples of materials suitable for the mask include lead and tungsten. Accordingly, in one embodiment, the crystals in the scintillator array 700 covered by the mask 800 in the first position are not exposed to gamma rays. The mask 800 is specified in the Mask Management Module 606.

Figure 9:
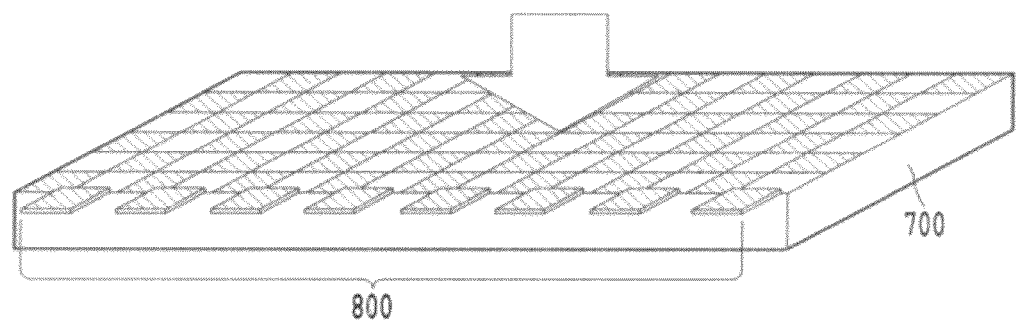
FIG. 9 illustrates a scintillator array with the mask having the lattice structure in a second position.

FIG. 9 illustrates the mask 800 shifted to a second position on the scintillator array 700. As illustrated in FIG. 9, in the second position, each crystal in the scintillator array 700 that was not covered by the mask 700 in the first position is covered by the mask 800 in the second position. Accordingly, in one embodiment, the crystals covered by the mask in the second position are not exposed to gamma rays. In one embodiment, the mask 800 is shifted from the first position to the second position manually, or alternatively, by any desired automated device.

In one embodiment, crystal identification of the scintillator array 700 using mask 800 is performed by first placing the mask 800 on the scintillator array 700 in the first position, as illustrated in FIG. 8, and exposing crystals in the scintillator array 700 not covered by the mask 800 to gamma rays. A first flood histogram is generated from the first exposure with the mask 800 in the first position. Second, the mask 800 is shifted to the second position on the scintillator array 700 (as illustrated in FIG. 9), and the crystals in the scintillator array 700 not covered by the mask in the second position are exposed to gamma rays. A second flood histogram is generated from the second exposure without the mask 800. As understood by one of ordinary skill in the art, the order of placing the mask 800 in the first or second position is reversed.

Accordingly, in one embodiment, the first flood histogram is superimposed with the second flood histogram. Thus, each crystal in the scintillator array 700 is identified using the superimposed flood histogram. As illustrated in FIGS. 8 and 9, since only a subset of crystals in the scintillator array 700 were exposed during the first and second exposures, the superimposed flood histogram of the first and second flood histograms is clearer than a flood histogram of the scintillator array 700 without using the mask, which makes the crystal identification process easier.

In other embodiments, crystal identification of the scintillator array 700 using mask 800 is performed by first placing the mask 800 on the scintillator array 700 in the first or second positions (as illustrated in FIG. 8 or 9, respectively) and exposing the scintillator array 700 to gamma rays. A first flood histogram is generated from the first exposure with the mask 800 in the first or second position. Second, the mask 800 is removed from the scintillator array 700 (as illustrated in FIG. 7), and all the crystals in the scintillator array 700 are exposed to gamma rays. A second flood histogram is generated from the second exposure without the mask 800. Accordingly, In one embodiment, the crystals in the scintillator array 700 that were not covered by the mask during the first exposure are identified using the first flood histogram, and the crystals in the scinitallator array 700 that were covered by the mask during the first exposure are identified by subtracting the first flood histogram from the second flood histogram. Based on the scintillator array 700 specified in the Scintillator Array Management Module 604 and the mask 800 specified in the Mask Management Module 800, the Crystal Identification Module 610 knows which crystals to identify when the first flood histogram is subtracted from the second flood histogram. The method of using no mask during the second exposure may be slightly faster compared to the method of displacing the mask due to the time required for repositioning the mask.

Figure 10:
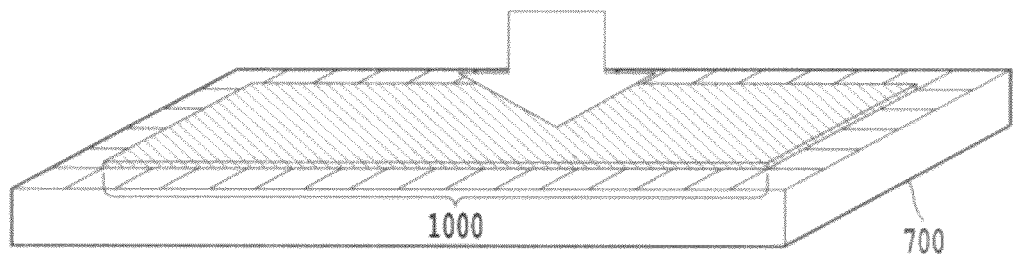
FIG. 10 illustrates scintillator array with a mask having a block structure.

Since the edge crystals are more difficult to identify than non-edge crystals, isolating the peaks corresponding to these edge crystals without other peaks from the center of the array would further facilitates crystal identification of the edge crystals. Accordingly, FIG. 10 illustrates another embodiment of the scintillator array 700 with a mask 1000. As illustrated in FIG. 10, the mask 1000 is configured to block all crystals except the edge crystals of the scintillator array 7000 from gamma rays. As further illustrated in FIG. 10, the mask 1000 is made without perforations or a lattice network, and is therefore cheaper and simpler to make compared to mask 800 (FIGS. 8 and 9).

In one embodiment, crystal identification of the scintillator array 700 using mask 1000 is performed by first placing the mask 1000 on the scintillator array 700 (as illustrated in FIG. 10) and exposing the scintillator array 700 to gamma rays. A first flood histogram is generated from the first exposure with the mask 1000. Next, the mask 1000 is removed from the scintillator array 700 (as illustrated in FIG. 7), and all the crystals in the scintillator array 700 are exposed to gamma rays. A second flood histogram is generated from the second exposure without the mask 1000. Accordingly, in one embodiment, the edge crystals of the scintillator array 700 are identified using the first flood histogram, and the remaining crystals of the scinitallator array 700 are identified by subtracting the first flood histogram from the second flood histogram.

Figure 11:
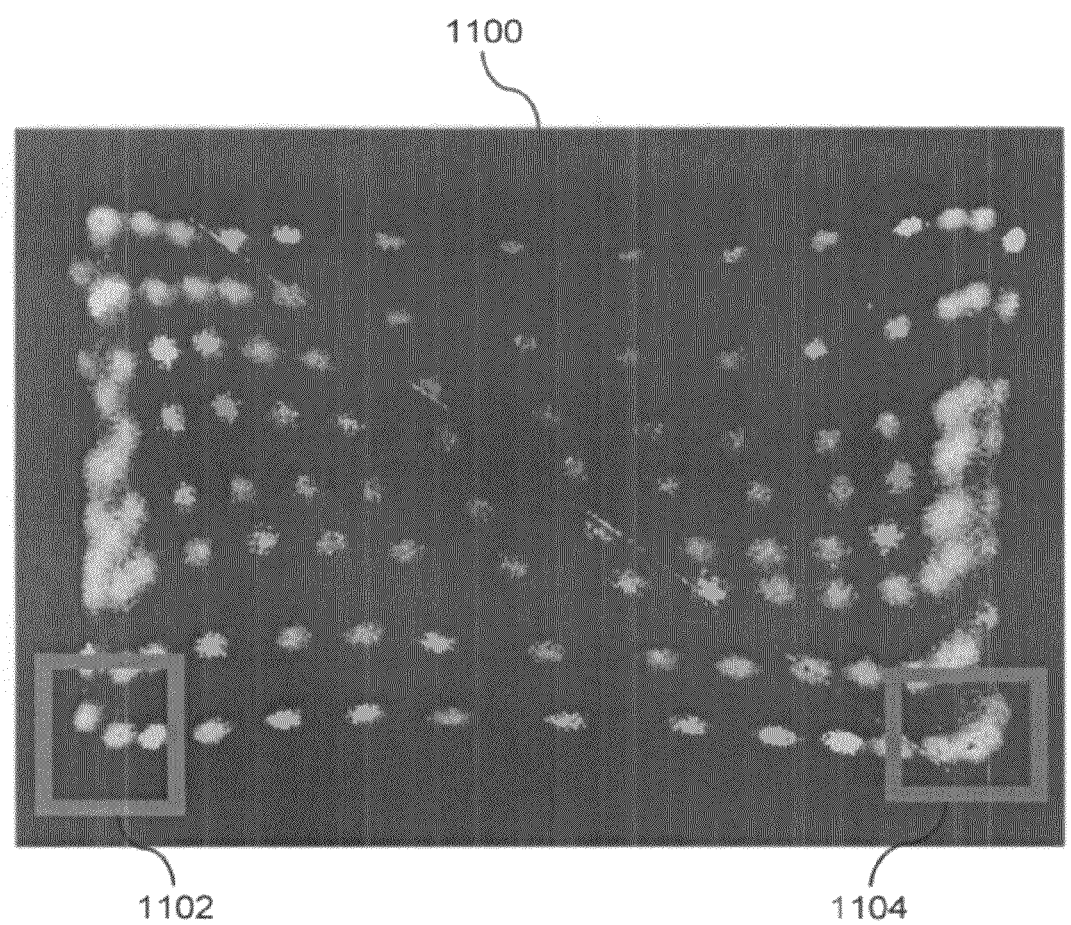
FIG. 11 illustrates an example flood histogram of a scintillator array without a mask.

FIG. 11 illustrates an example flood histogram 1100 of the scintillator array 700 without a mask. The flood histogram 1100 shows both distorted and non-distorted edge crystals. For example, the group of crystals grouped in box 1102 are not distorted and can be properly identified. However, the group of crystals grouped in box 1104 are distorted and cannot be properly identified. Further, there are distortions within the flood histogram caused by light from two neighboring crystals interfering with each other. Accordingly, by using the lattice structure mask 800 (FIGS. 8 and 9), a flood histogram with reduced distortions is produced. Similarly, by using the block mask 1000 (FIG. 10), a flood histogram with reduced distortions around the edges is produced.

Figure 12:
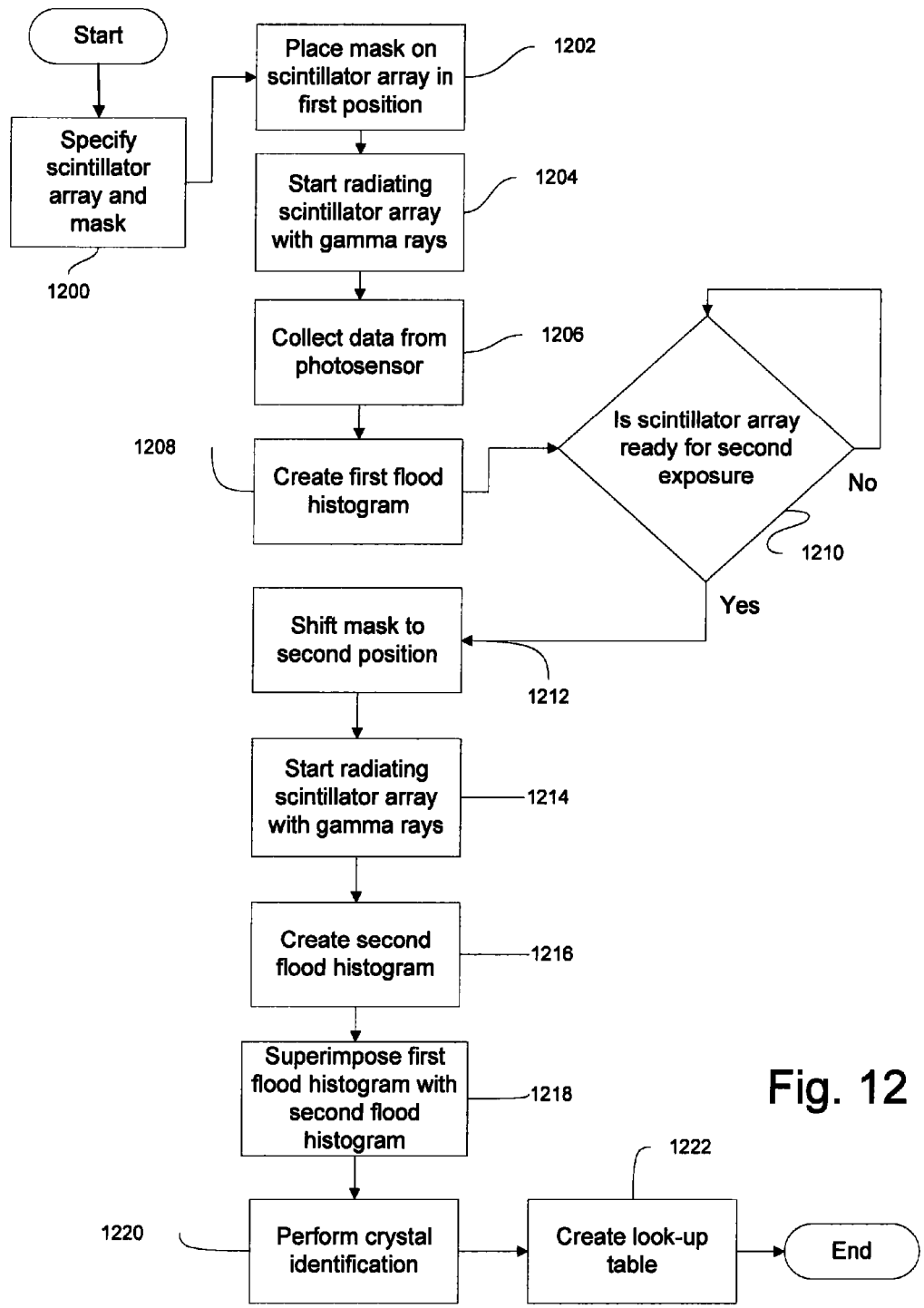
FIG. 12 illustrates an example process for performing crystal identification using a mask.

FIG. 12 illustrates an example process for performing crystal identification using a mask. In one embodiment, the process illustrated in FIG. 12 is performed by the PET management system 600.

The process generally starts at 1200 where a scintillator array and mask are specified. As an example, with respect to FIG. 8, the 6×16 scintillator array and mask 800 is specified to the Scintillator Array Management Module 604 and the Mask Management Module 606, respectively.

Process flow proceeds to 1202 where a mask is placed on the scintillator array in a first position. As an example, the mask 800 is placed on the scintillator array 700 in a first position as illustrated in FIG. 8. Process flow proceeds to 1204 to start exposing the scintillator array with gamma rays. As an example, a patient subject may ingest a radio pharmaceutical agent causing annihilation events producing gamma rays.

Process flow proceeds to 1206 to collect data from a photosensor as functionally described above. Process flow proceeds to 1208 where the Flood Histogram Module 608 (FIG. 6) creates a first flood histogram. Process flow proceeds from 1208 to 1210 to shift the mask to a second position. For example, the mask 800 is shifted from the first position to the second position on the scintillator array 700 as illustrated in FIG. 9.

Process flow proceeds to 1212 to start radiating the scintillator array with gamma rays, for example, as functionally described above with respect to 1204. Process flow proceeds to 1214 to collect data for the second exposure from the photosensors as functionally described above with respect to 1206.

Process flow proceeds to 1216 to create a second flood histogram as functionally described above with respect to 1208. Process flow proceeds to 1218 to superimpose the first flood histogram with the second flood histogram. Process flow proceeds to 1220 where the Crystal Identification Module 610 (FIG. 6) uses any desired algorithm to identify the crystals of the scintillator array. Process flow proceeds to 1222 where, for example, the LUT Module creates a look-up table. In one embodiment, after the look-up table is created, the process illustrated in FIG. 12 ends.

Figure 13:
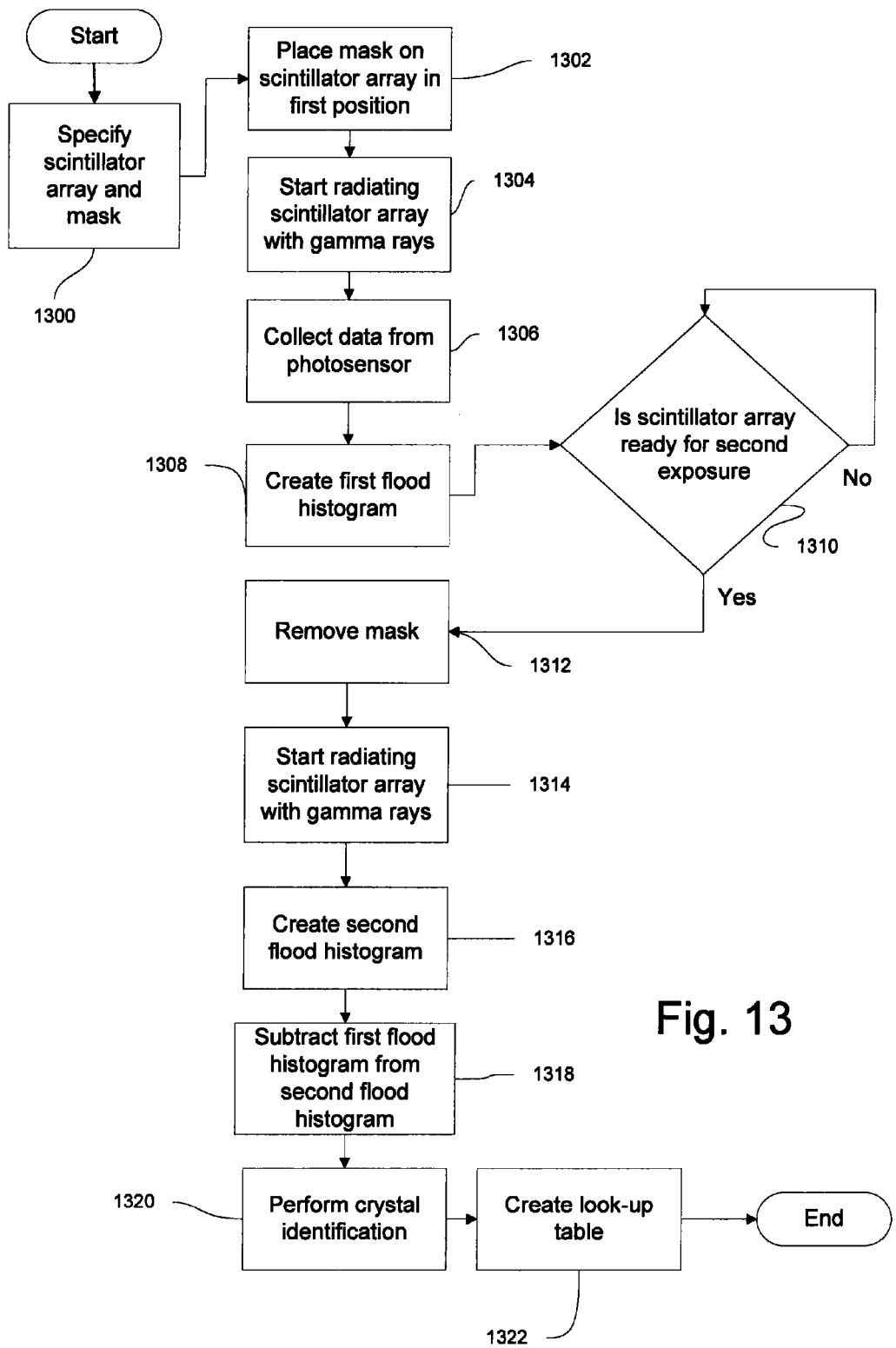
FIG. 13 illustrates another example process for performing crystal identification using a mask.

FIG. 13 illustrates another example process for performing crystal identification using a mask. In one embodiment, process flow 1300-1308 is identical to the process flow disclosed above for 1400-1416 (FIG. 14).

Process flow proceeds from 1308 to 1310 where the mask is removed. As an example, when there is no mask on the scintillator array, all the crystals in the scintillator array are exposed to gamma rays, as illustrated FIG. 7. Process flow proceeds to 1312 to start radiating the scintillator array without the mask as functionally described above.

Process flow proceeds to 1316 to create a second flood histogram as functionally described above. Process flow proceeds to 1318 to subtract the first flood histogram from the second flood histogram. Process flow proceeds to 1320 to perform crystal identification as functionally described above. Process flow proceeds to 1322 to create a look-up table as functionally described above. In one embodiment, after the look-up table is created, the process illustrated in FIG. 13 ends.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method for creating a look-up table for determining a crystal of interaction in a gamma ray detector, the method comprising:
   arranging a mask configured to cover a subset of crystals of a plurality of crystals in a scintillation array so as to block exposure of the subset of crystals to gamma rays, the mask being aligned on the scintillation array in a first position to cover a first set of crystals;
   exposing the scintillation array to gamma rays having a predetermined energy;
   collecting a first set of data from at least one photosensor positioned to receive light generated by the scintillation array;
   realigning the mask in a second position on the scintillation array to cover a second subset of crystals of the plurality of crystals, the second subset of crystals being different than the first subset of crystals;
   repeating the exposing step with the mask aligned on the scintillation array in the second position;
   collecting a second set of data from the at least one photosensor with the mask aligned on the scintillation array in the second position;
   creating a first flood histogram from the first set of collected data and creating a second flood histogram from the second set of collected data;
   superimposing the first flood histogram with the second flood histogram to create a superimposed flood histogram; and
   generating a look-up table by assigning regions of the superimposed flood histogram to corresponding crystals of the plurality of crystals.

2. The method of claim 1, wherein the mask is configured to block gamma rays having an energy level of 511 keV or greater.

3. The method of claim 1, wherein the mask is a lattice structure that does not cover two consecutively positioned crystals in the scintillation array.

4. The method of claim 1, wherein the mask is a block structure that covers at least two consecutively positioned crystals in the scintillation array.

5. The method of claim 1, wherein the mask covers only edge crystals in the scintillation array.

6. A method for creating a look-up table for determining a crystal of interaction in a gamma ray detector, the method comprising:
   arranging a mask configured to cover a subset of crystals of a plurality of crystals in a scintillation array so as to block exposure of the subset of crystals to gamma rays, the mask being aligned on the scintillation array in a first position to cover a first set of crystals;
   exposing the scintillation array to gamma rays having a predetermined energy;
   collecting a first set of data from at least one photosensor positioned to receive light generated by the scintillation array;
   removing the mask from the scintillation array;
   repeating the exposing step with the mask removed from the scintillation array to expose each crystal in the plurality of crystals to the generated gamma rays;
   collecting a second set of data from the at least one photosensor without the mask aligned on the scintillation array;
   creating a first flood histogram from the first set of collected data and creating a second flood histogram from the second set of collected data;
   subtracting the first flood histogram from the second flood histogram to create a modified flood histogram; and
   generating a look-up table by assigning regions of the first flood histogram and the modified flood histogram to corresponding crystals of the plurality of crystals.

7. The method of claim 6, wherein the mask is configured to block gamma rays having an energy level of 511 keV or greater.

8. The method of claim 6, wherein the mask is a lattice structure that does not cover two consecutively positioned crystals in the scintillation array.

9. The method of claim 6, wherein the mask is a block structure that covers at least two consecutively positioned crystals in the scintillation array.

10. The method of claim 6, wherein the mask covers only edge crystals in the scintillation array.

11. A Positron Emission Tomography (PET) system for crystal identification, the system comprising:
    a scintillation array including a plurality of crystals;
    a mask configured to cover a subset of crystals of the plurality of crystals so as to block exposure of the subset of crystals to gamma rays;
    at least one photosensor positioned to receive light generated by the scintillation array; and
    a processor configured to
      collect a first set of data from the at least one photosensor in response to exposure of the scintillation array to gamma rays when the mask is arranged on the scintillation array in a first position to cover a first subset of crystals;
      collect a second set of data from the at least one photosensor in response to exposure of the scintillation array to gamma rays when the mask is arranged on the scintillation array in a second position to cover a second subset of crystals being different than the first subset of crystals;

create a first flood histogram from the first set of collected data and create a second flood histogram from the second set of collected data;

superimpose the first flood histogram with the second flood histogram to create a superimposed flood histogram; and generate a look-up table by assigning regions of the superimposed flood histogram to corresponding crystals of the plurality of crystals.

12. The system of claim 11, wherein the mask is configured to block gamma rays having an energy level of 511 keV or greater.

13. The system of claim 11, wherein the mask is a lattice structure that does not cover two consecutively positioned crystals in the scintillation array.

14. The system of claim 11, wherein the mask is a block structure that covers at least two consecutively positioned crystals in the scintillation array.

15. The system of claim 11, wherein the mask covers only edge crystals in the scintillation array.

16. A Positron Emission Tomography (PET) system for crystal identification, the system comprising:

a scintillation array including a plurality of crystals;

a mask configured to cover a subset of crystals of the plurality of crystals so as to block exposure of the subset of crystals to gamma rays;

at least one photosensor positioned to receive light generated by the scintillation array; and a processor configured to collect a first set of data from the at least one photosensor in response to exposure of the scintillation array to gamma rays when the mask is arranged on the scintillation array in a first position to cover a first subset of crystals;

collect a second set of data from the at least one photosensor in response to exposure of the scintillation array when the mask is removed from the scintillation array;

create a first flood histogram from the first set of collected data;

create a second flood histogram from the second set of collected data;

subtract the first flood histogram from the second flood histogram to create a modified flood histogram; and generate a look-up table by assigning regions of the first flood histogram and the modified flood histogram to corresponding crystals of the plurality of crystals.

17. The system of claim 16, wherein the mask is configured to block gamma rays having an energy level of 511 keV or greater.

18. The system of claim 16, wherein the mask is a lattice structure that does not cover two consecutively positioned crystals in the scintillation array.

19. The system of claim 16, wherein the mask is a block structure that covers at least two consecutively positioned crystals in the scintillation array.

20. The system of claim 16, wherein the mask covers only edge crystals in the scintillation array.

* * * * *